(12) United States Patent
Modat

(10) Patent No.: US 6,488,436 B1
(45) Date of Patent: Dec. 3, 2002

(54) BALL JOINT, IN PARTICULAR STEERING OR SUSPENSION BALL JOINT FOR MOTOR VEHICLES AND, METHOD FOR MAKING A BEARING FOR SAME

(75) Inventor: Marie-Laure Modat, Villefranche sur Saone (FR)

(73) Assignee: Societe Mecanique de Villeurbanne, Villeurbanne (FR)

( * ) Notice: Subject to any disclaimer, the term of this patent is extended or adjusted under 35 U.S.C. 154(b) by 0 days.

(21) Appl. No.: 09/889,583
(22) PCT Filed: Apr. 30, 1999
(86) PCT No.: PCT/FR99/01036
§ 371 (c)(1), (2), (4) Date: Aug. 1, 2001
(87) PCT Pub. No.: WO00/46092
PCT Pub. Date: Aug. 10, 2000

(30) Foreign Application Priority Data

Feb. 4, 1999 (FR) .............................. 99/01314

(51) Int. Cl.[7] .................... F16C 23/06; F16C 11/06
(52) U.S. Cl. ..................... 403/135; 403/122; 403/133; 403/140
(58) Field of Search ............... 403/2, 27, 39, 403/122, 124, 132, 133, 135, 138, 140; 29/283.5, 441.1, 446, 520, 522.1, 707, 898.051; 261/138, 318, 242

(56) References Cited

U.S. PATENT DOCUMENTS

| 3,226,141 A | * | 12/1965 | Sullivan | 403/135 |
| 3,451,701 A | * | 6/1969 | Smith | 403/140 |
| 4,235,582 A | | 11/1980 | Holmes | |
| 4,318,627 A | * | 3/1982 | Morin | 403/133 |
| 5,188,476 A | | 2/1993 | Mori | |
| 5,704,727 A | * | 1/1998 | Atkins et al. | 403/135 |
| 5,795,092 A | * | 8/1998 | Jaworski et al. | 403/56 |
| 6,082,923 A | * | 7/2000 | Maughan | 403/135 |
| 6,164,829 A | * | 12/2000 | Wenzel et al. | 384/203 |
| 6,254,114 B1 | * | 7/2001 | Pulling et al. | 280/93.511 |
| 6,302,615 B1 | * | 10/2001 | Kleiner et al. | 403/135 |
| 6,398,446 B1 | * | 6/2002 | Pazdirek et al. | |

FOREIGN PATENT DOCUMENTS

| DE | 41 38 609 A1 | * | 5/1993 | 403/135 |
| EP | 0 779 442 | | 6/1997 | |
| GB | 2 106 173 A | * | 4/1983 | 403/135 |
| GB | 2 216 506 | | 10/1989 | |
| JP | 358146714 A | * | 9/1983 | 403/135 |

* cited by examiner

Primary Examiner—Robert J. Sandy
Assistant Examiner—Ruth C. Rodriguez
(74) Attorney, Agent, or Firm—Oblon, Spivak, McClelland, Maier & Neustadt, P.C.

(57) ABSTRACT

A ball joint, and in particular a motor vehicle steering or suspension ball joint, which includes a pivot with a spherical head, a ball joint case with a housing for receiving the pivot head and a case housing, and a plastic bearing interposed between the pivot head and the case housing. The ball joint bearing includes a cup molded in one single piece, closed at a base, and having a molded inner spherical surface extending over more than one hemisphere. A circular orifice with a diameter smaller than the spherical inner surface diameter, opposite the base, is also provided as are several rupture zones distributed on the periphery of the opening part and shaped so as to be subjected to a predefined rupture into two sections when the opening part first expands and to enable, after the head has been inserted in the bearing, an elastic tightening of the opening part with accurate repositioning of the two sections of each rupture zone around the head.

8 Claims, 8 Drawing Sheets

BALL JOINT, IN PARTICULAR STEERING OR SUSPENSION BALL JOINT FOR MOTOR VEHICLES AND, METHOD FOR MAKING A BEARING FOR SAME

The present invention relates to a ball joint, especially a steering or suspension ball joint for motor vehicles, comprising a pivot provided with a spherical head, a ball-joint case provided with a housing for receiving the said pivot head, and a bearing shell of plastic material interposed between the pivot head and the case housing.

The invention also relates to a process for manufacture of a bearing shell for such a ball joint.

Ball joints comprising a bearing shell of plastic material are known.

According to U.S. Pat. No. 5,152,628 (=German Patent A 4032541), a bearing shell in the form of a spherical zone extending on both sides of the equator is provided on one side of the equator with a plurality of meridian slits which limit plastic deformation of the bearing shell during mounting of the spherical head of the pivot in the bearing shell by expansion of the part equipped with slits. Nevertheless, these slits have an unfavorable influence on the lubrication of the pivot. In fact, these slits exhibit rough areas and excessive thicknesses derived from the method for manufacture of the bearing shell, leading to excessive pressures and in turn an increase in the friction of the ball joint.

According to European Patent A 0653573, a bearing shell is molded in the form of a hemispherical cup, which is prolonged on its orifice side by a cylindrical skirt which, during assembly of the ball joint, is deformed plastically into a spherical segment by a locking ring of the ball joint. This does not allow control of the friction, and so large variations of the friction moment occur during mounting, during the first displacements of the pivot and throughout the entire operation of the ball joint.

For all of these reasons, the known ball joints are not satisfactory and, when used as steering ball joints, for example, lead to deterioration of the return movement of the steering, of centering around the mean position, of driving comfort and even of steering response.

The object of the present invention is a ball joint which is distinguished from known ball joints both by a reduction of friction and by a reduction of the variations of the friction moment under radial and axial load, of elasticity and of wear, throughout the entire life of the ball joint.

The ball joint which is the object of the invention comprises a pivot provided with a spherical head, a ball-joint case provided with a housing to receive the said pivot head, and a bearing shell of plastic material interposed between the pivot head and the case housing. The bearing shell of the ball joint comprises a one-piece molded cup, closed at the bottom side and provided, by molding, with a spherical inside surface extending over a solid angle corresponding to more than one hemisphere, with a circular orifice, whose diameter is smaller than the diameter of the spherical inside surface, opposite the bottom, and with a plurality of rupture zones of small thickness distributed over the circumference of the orifice part, while extending from the said orifice toward the equatorial plane of the spherical surface disposed parallel to the plane of the said orifice, the said rupture zones having such a conformation that each undergoes predefined rupture into two sections during a first expansion of the orifice part and that, after insertion of the pivot head into the bearing shell, elastic constriction of the orifice part is permitted together with exact repositioning of the two sections of each rupture zone around the pivot head.

The provision of rupture zones makes it possible to mold the bearing shell in the form of a cup having a continuous spherical inside surface while remedying the drawbacks resulting, in the known ball joints, from the presence of the slits needed to permit assembly of the ball joint or plastic deformations occurring during assembly.

Preferably the rupture zones have a conformation that each gives rise to a rupture along a zig-zag line, predefined by a corresponding line of weakness.

To obtain a ball joint with a predefined friction and damping effect, the bearing shell can be provided on the outside, in the equatorial zone, with a cylindrical part, which toward the bottom zone is followed by a substantially conical part. In corresponding manner, the housing of the case is provided with a cylindrical part followed by a substantially conical bottom part.

Preferably the conical part at the bottom of the housing of the case can comprise a frustoconical outside zone, with a taper angle larger than the taper angle of the conical part of the bottom zone of the bearing shell and a conical inside (central) zone with a taper angle smaller than the taper angle of the said conical outside part of the bearing shell.

Preferably the bearing shell is provided, between its cylindrical outside part and its orifice, with a frustoconical outside part followed at the level of the orifice by an outside shoulder. The ball joint additionally comprises a locking ring which is provided with a frustoconical inside surface corresponding to the said frustoconical outside part of the bearing shell, and which, after insertion of the pivot head into the bearing shell, can be interlocked behind the shoulder of the bearing shell so as to maintain the assembled pivot and bearing shell in the form of a module capable of being mounted as such in the case of the ball joint and of being fixed therein, for example by crimping. By the dimensioning of this locking ring, it is possible perfectly to control the play between the bearing shell and the pivot of the ball joint.

The bearing shell of the ball joint according to the invention can be manufactured by advantageously molding the bearing shell between a fixed mold part whose cavity corresponds at least to the bottom part of the bearing shell, at least one movable mold part whose cavity corresponds at least to the orifice part of the bearing shell, and a movable core with spherical head, whose shape corresponds substantially to the shape of the spherical head of the pivot of the ball joint. To remove the bearing shell from the mold, there are successively displaced a) the movable mold part, to release the orifice part of the bearing shell, or in other words the part comprising the rupture zones, toward the outside, and b) the movable core, to extract the spherical head of the bearing shell on the orifice side, while causing well-defined rupture of the said rupture zones by expansion of the orifice part of the bearing shell.

Preferably the bearing shell is blocked in the fixed part of the mold during extraction of the spherical head of the core.

An illustrative and non-limitative practical example of a ball joint according to the invention and a practical example of the process for manufacture of the bearing shell of this ball joint will be described in more detail hereinafter with reference to the attached drawings, wherein.

Figure 1:
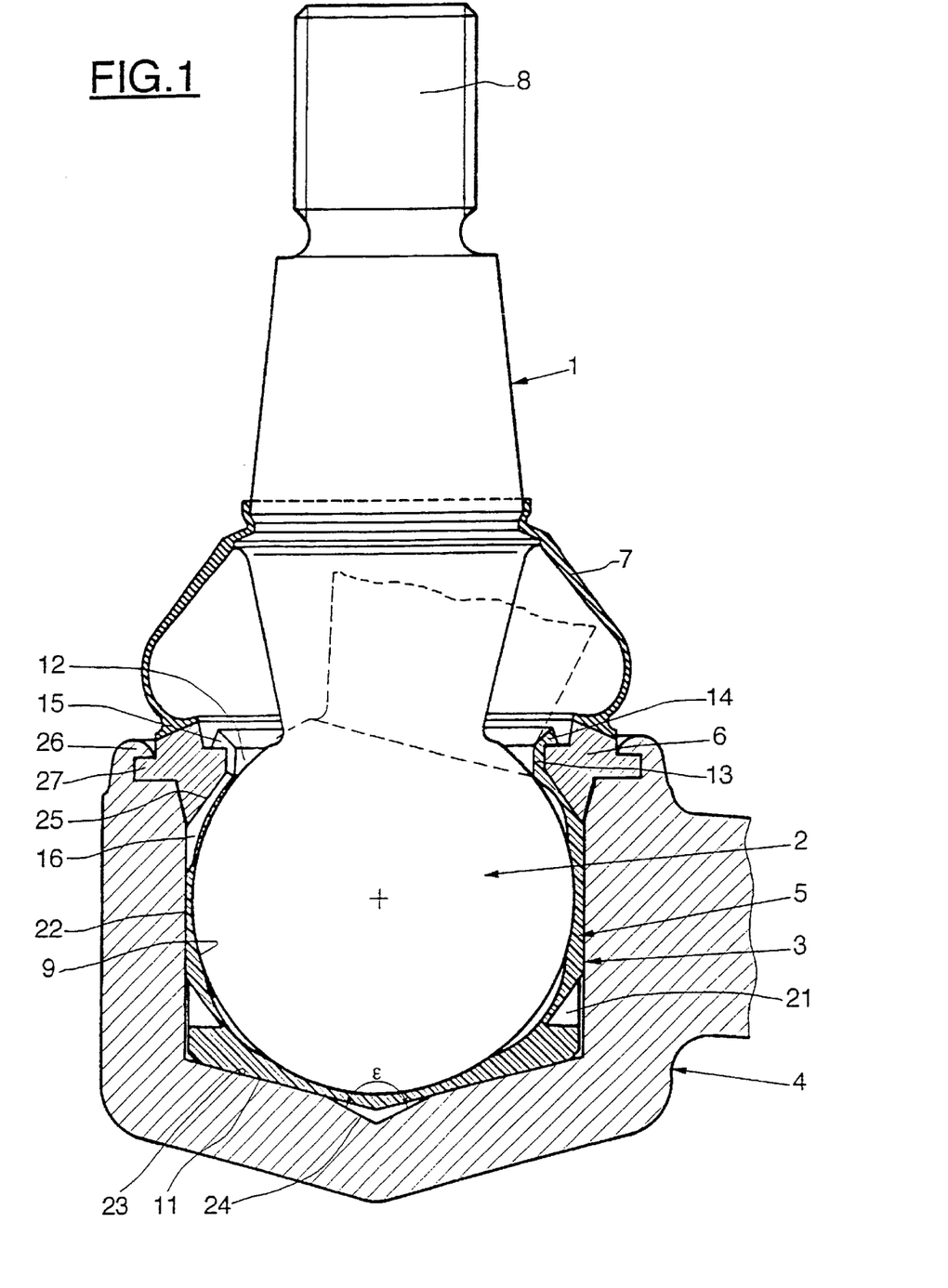
FIG. 1 is an axial section of a ball joint according to the invention.

The ball joint illustrated by FIG. 1, for example a steering ball joint, comprises a pivot 1 whose spherical head 2 is mounted movably to rotate around its axis and to pivot (as represented by broken lines) in a housing 3 of a ball-joint case 4. A bearing shell 5 of plastic material is interposed between head 2 of pivot 1 and housing 3 of case 4, and a locking ring 6 maintains the assembly of head 2 and bearing shell 5 in housing 3 of case 4. An elastic bellows 7 fixed at one end to ring 6 and at the other end to pivot 1, between head 2 and a threaded joint base 8 of pivot 1, isolates the assembly of head 2 and bearing shell 5 from the outside, to prevent ingress of extraneous material and loss of lubricant.

Figure 2:
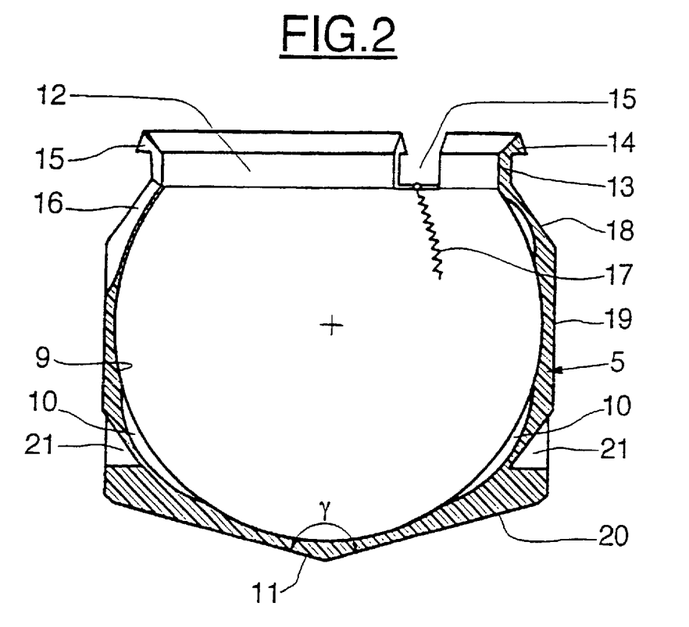
FIG. 2 is an axial section of the bearing shell of the ball joint of FIG. 1.
Figure 3:
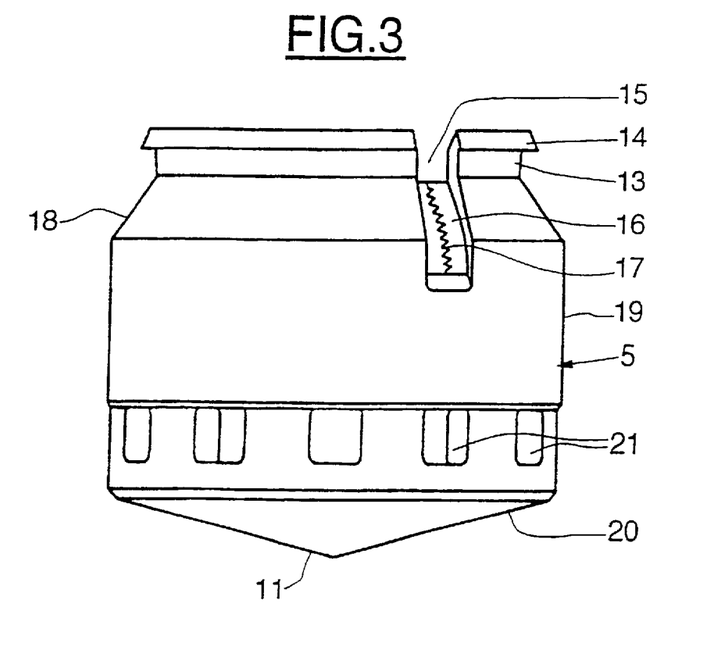
FIG. 3 is an outside view of the bearing shell of FIG. 2.

As shown in FIGS. 2 and 3, bearing shell 5 has substantially the form of a cup, with a spherical inside surface 9, which as the case may be can be provided with a plurality of hollows or depressions 10 forming lubricant reservoirs. Spherical inside surface 9 extends over a solid angle corresponding to more than one hemisphere, or approximately 3 π in the illustrated example under consideration. Opposite its closed bottom part 11, bearing shell 5 is provided with a circular orifice 12 of diameter smaller than the diameter of spherical inside surface 9. Bearing shell 5 is prolonged beyond orifice 12 by a substantially cylindrical part 13, which is terminated by an outside shoulder 14 having a chamfered profile on the inside and outside.

Prolongation 13 and shoulder 14 are interrupted by three notches 15 distributed at 120° relative to one another. Each notch 15 is prolonged toward bottom part 11 by a zone 16 of reduced thickness provided, at the middle of its width, with a well-defined rupture line 17, for example a zig-zag line of weakness.

On the outside, bearing shell 5 is provided in succession, between prolongation 13 and bottom part 11, with a frustoconical part 18, a cylindrical part 19 and a conical part 20 having a taper angle γ.

Zones 16 of reduced thickness are formed on the outside, or in other words from the outside surface toward the inside surface, across frustoconical part 18 as far as cylindrical part 19, up to a short distance from the equatorial plane parallel to orifice 12, without affecting inside surface 9 of bearing shell 5, as is shown in particular in FIG. 2.

In addition, bearing shell 5 is provided on the outside, in cylindrical part 19, with a plurality of hollows or pockets 21, whose function is related to the process for manufacture of bearing shell 5, described hereinafter.

Housing 3 of ball-joint case 4 according to FIG. 1 has a shape matched to the outside shape of bearing shell 5. In the present case, housing 3 comprises mainly a part of cylindrical surface 22 corresponding to cylindrical part 19 of bearing shell 5, and a frustoconical bottom surface 23 matched to conical surface 20 of bottom 11 of bearing shell 5. It should be noted that frustoconical bottom surface 23 surrounds a central part 24, whose taper angle ε is smaller than the taper angle of remaining part 23, and therefore smaller than taper angle γ of outside surface 20 of bottom 11 of bearing shell 5.

Locking ring 6, which is shown in FIG. 1, is assembled together with bearing shell 5 after spherical head 2 of pivot 1 has been placed in bearing shell 5. Placement of the head in bearing shell 5 necessitates expansion of bearing shell 5 in its orifice part, or in other words the part comprising frustoconical outside part 18, prolongation 13 and shoulder 14. This expansion is possible after rupture of rupture zones 16 at the position of weakness zones 17, these ruptures giving the parts situated between rupture lines 16 sufficient elasticity to undergo elastic expansion as far as the diameter of spherical head 12.

Once spherical head 2 of pivot 1 has been placed in bearing shell 5, locking ring 6 is snapped in behind shoulder 14 of prolongation 13, this snap-in operation being facilitated by frustoconical inside surface 25 of locking ring 6, with taper angle corresponding to the taper angle of frustoconical outside part 18 of bearing shell 5.

It is important to note that the inside diameter of locking ring 6 is preferably slightly smaller than the outside diameter of prolongation 13 of bearing shell 5. By this fact, while locking ring 6 is being snapped in on bearing shell 5 enclosing spherical head 2 of pivot 1, ring 6 exerts a radial clamping action on prolongation 13, which leads to constriction of bearing shell 5 around head 2, such that the taper angle of conical outside surface 20 of the bottom of bearing shell 5 decreases slightly. This constriction has the effect of preventing any play between head 2 of pivot 1 and bearing shell 5 on the ball-joint module comprising pivot 1, bearing shell 5 and locking ring 6 assembled together, before this module is mounted in ball-joint case 4.

Finally, the ball-joint module comprising pivot 1, bearing shell 5 surrounding spherical head 2 of pivot 1, as well as locking ring 6 snapped in around the orifice part of bearing shell 5, is mounted in ball-joint case 4, the outside shape of bearing shell 5 assuming the shape of housing 3 of case 4, and fixation ring 6 is fixed to case 4 by crimping an inside shoulder 26 of case 4 onto an outside collar 27 of locking ring 6.

During crimping of the module into ball-joint case 4, a thrust (toward the bottom in FIG. 1) is exerted on pivot 1. Depending on the magnitude of this thrust, it is possible to control the deformation that bearing shell 5 undergoes in its bottom zone 11, by the fact of the particular conformation of bottom zone 23, 24 of housing 3, and thereby to establish friction and damping of the ball joint, while eliminating any radial and axial play.

FIGS. 4 to 9 illustrate a process for manufacture of bearing shell 5, making it possible directly to obtain bearing shell 5 together with its already broken rupture zones 16.

Figure 4:
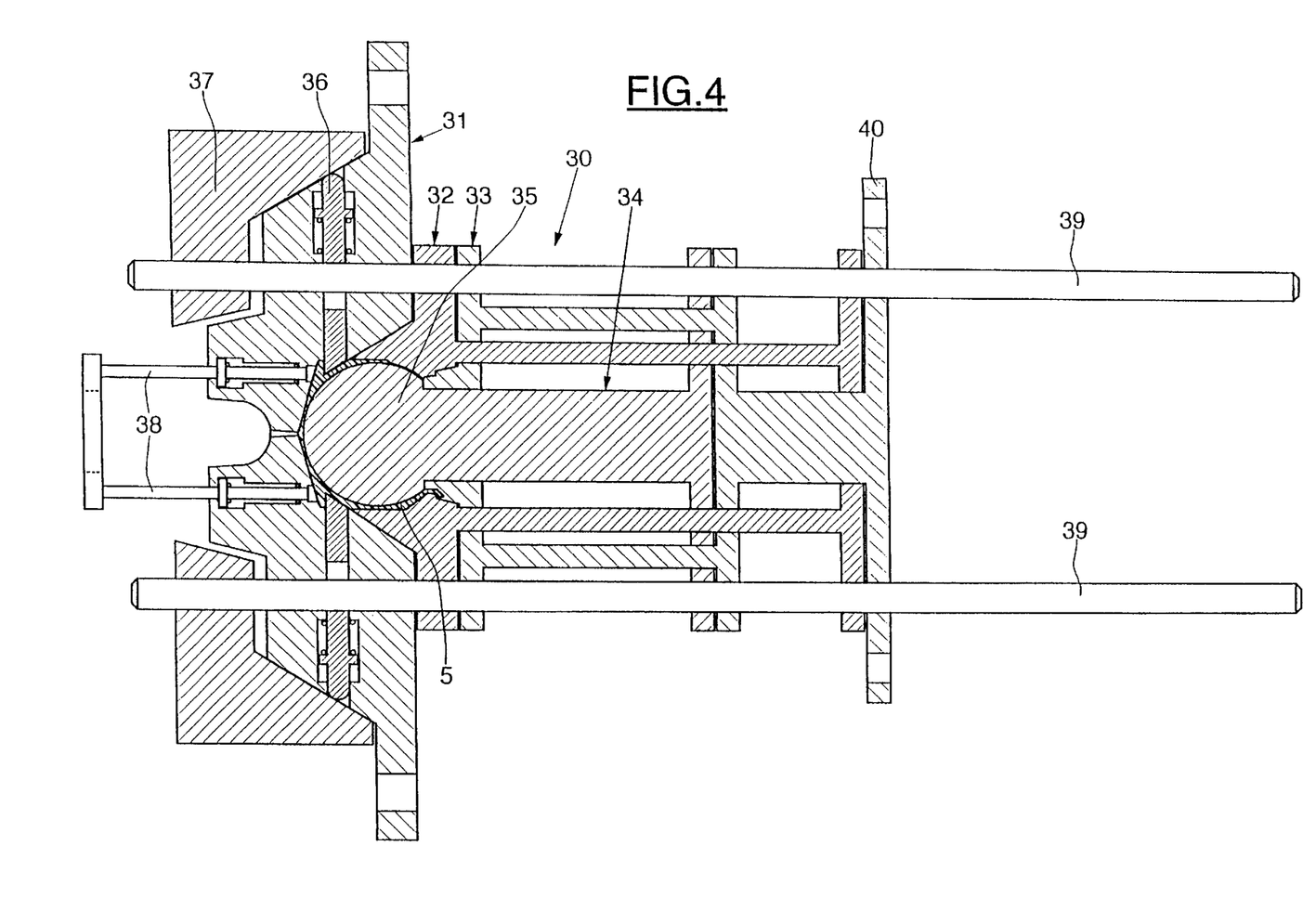
FIGS. 4 to 9 represent cross-sectional views of the sequences of removal of the bearing shell according to FIGS. 2 and 3 from the mold.

According to FIG. 4, bearing shell 5 as illustrated by FIGS. 2 and 3 is molded in an injection-molding machine 30 comprising a fixed mold platen 31 which forms the outside surface of bottom part 11 and a part of cylindrical zone 19, a movable mold platen 32, which forms the remaining outside surface (remaining part of cylindrical zone 19, frustoconical part 18 with rupture zones 16, prolongation 13, shoulder 14), a movable mold platen 33, which forms the inside surface of prolongation 13 and of shoulder 14, and a movable core 34 comprising a spherical head 35 which forms spherical inside surface 9 of bearing shell 5. There are also shown a plurality of slides 36 mounted to be movable in radial translation in fixed mold platen 31 and controlled by a movable blocking platen 37, and ejectors 38 mounted to be movable in axial translation in platen 31.

Figure 5:
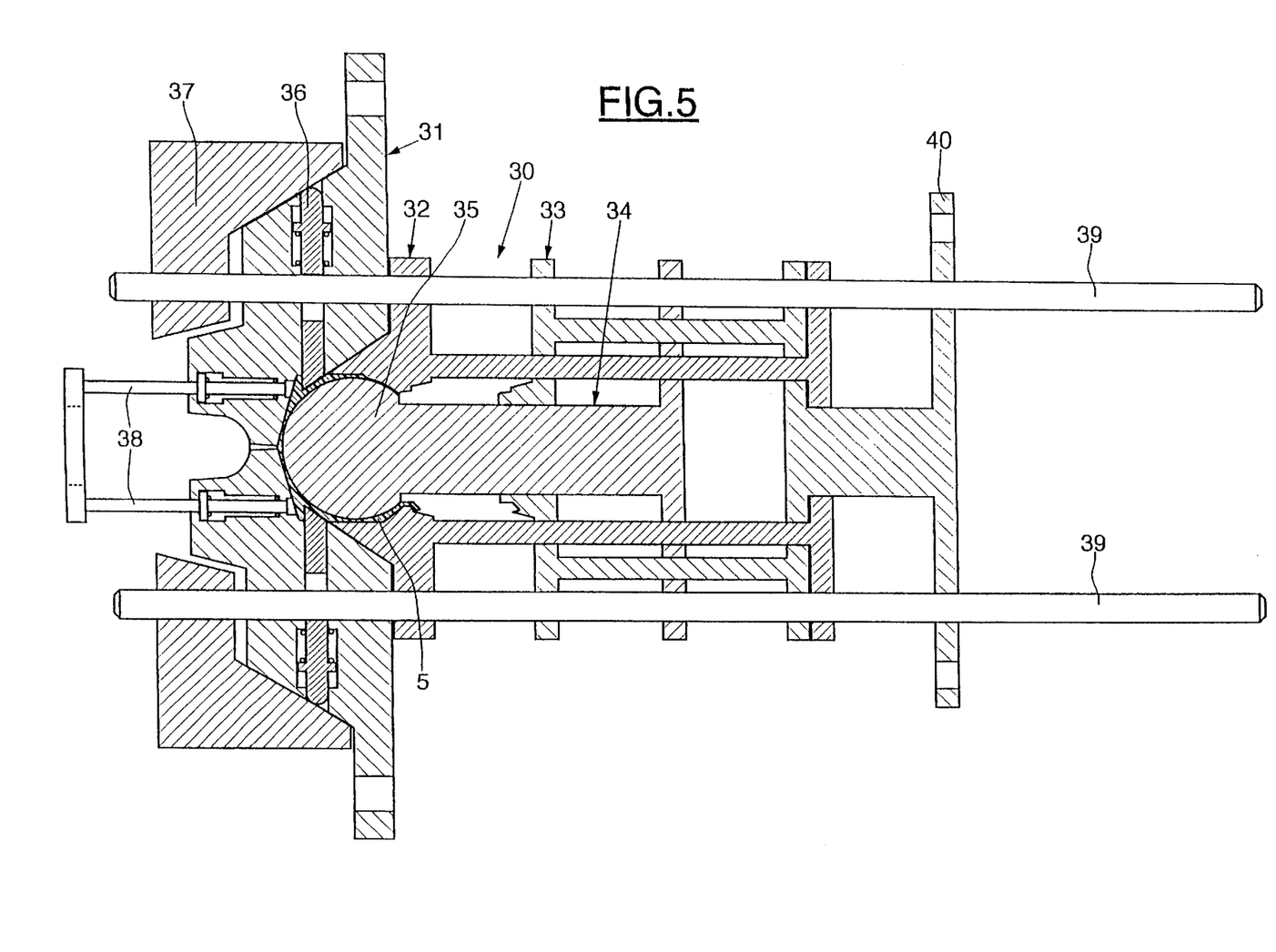
Figure 6:
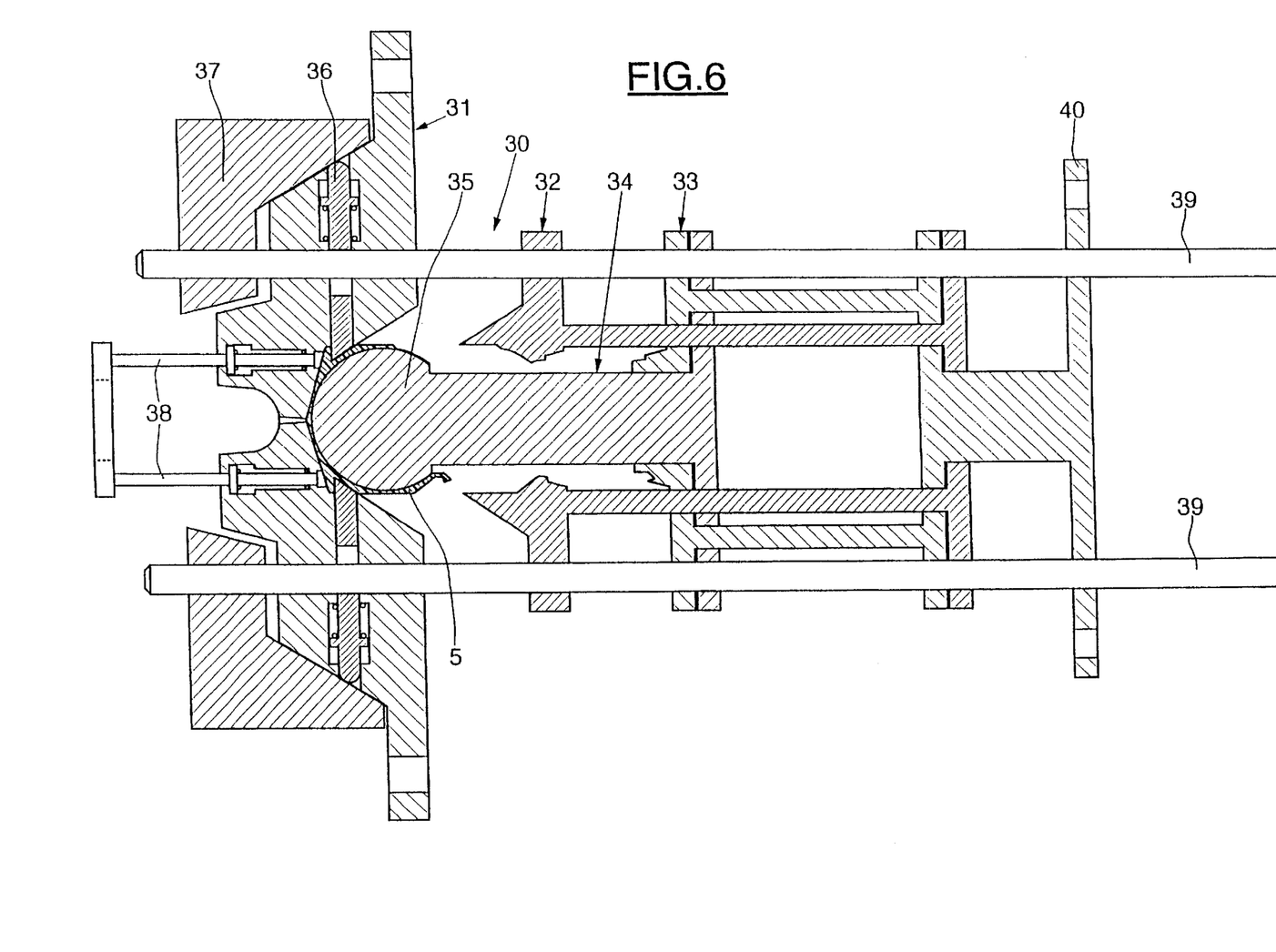
Figure 7:
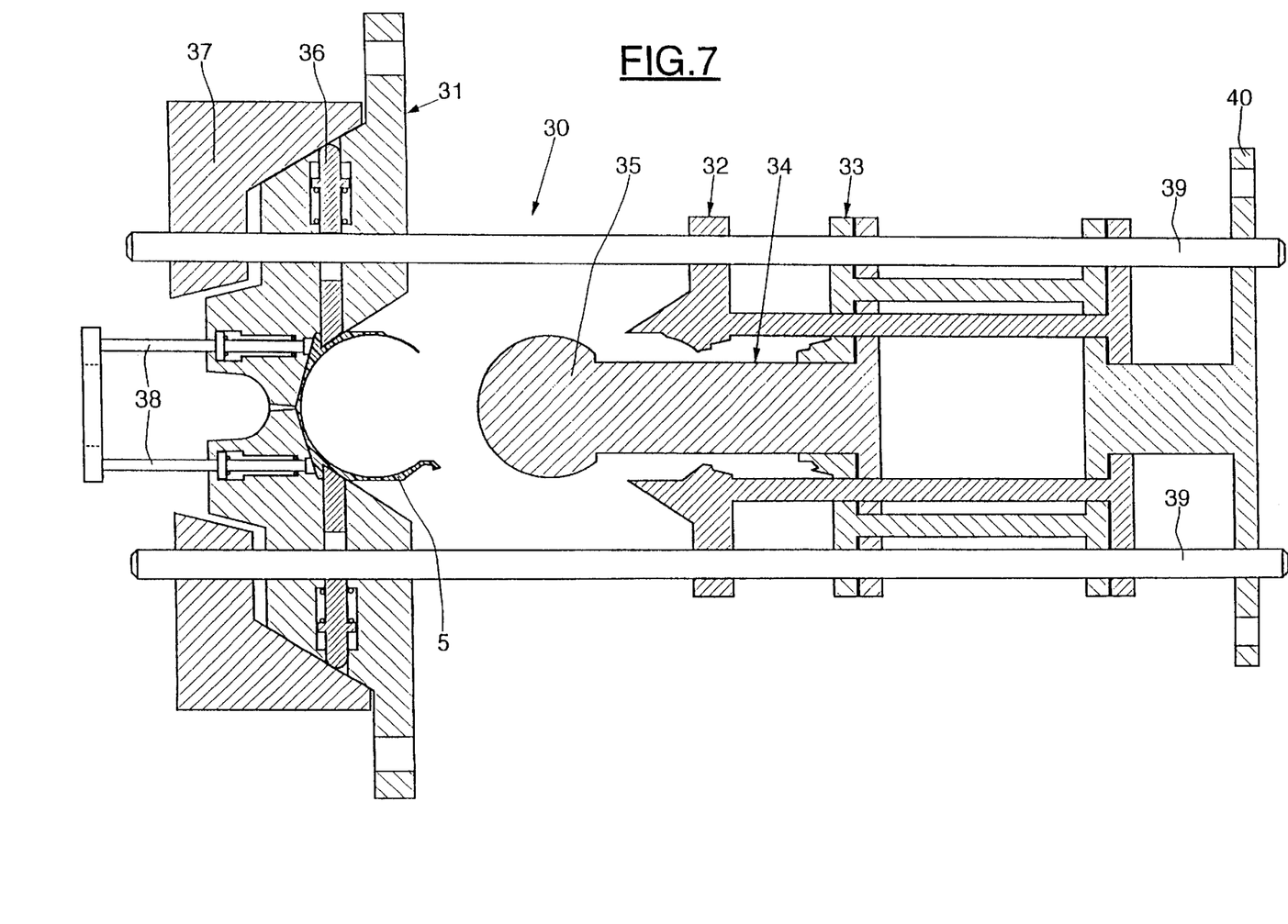
Figure 8:
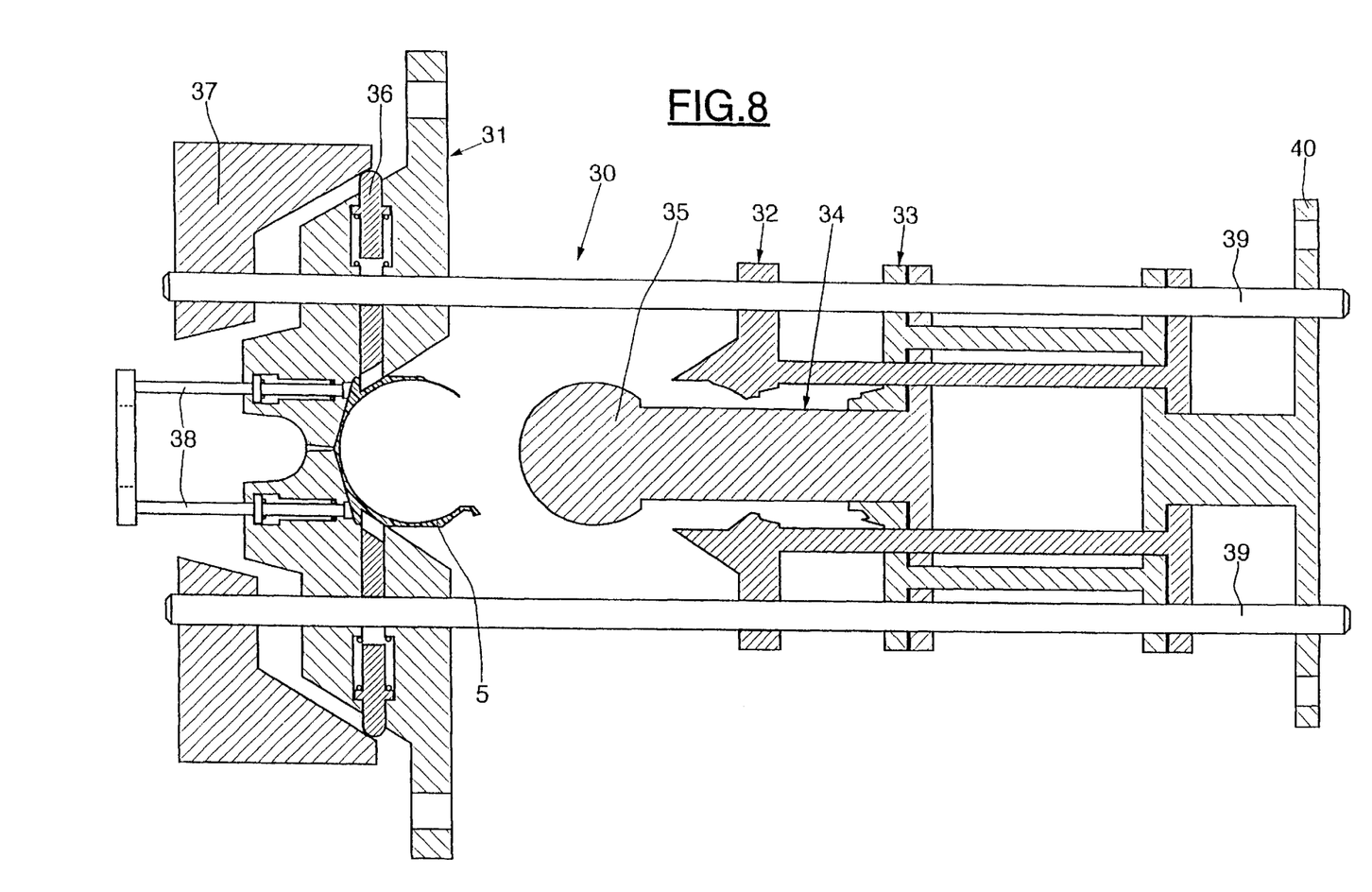
Figure 9:
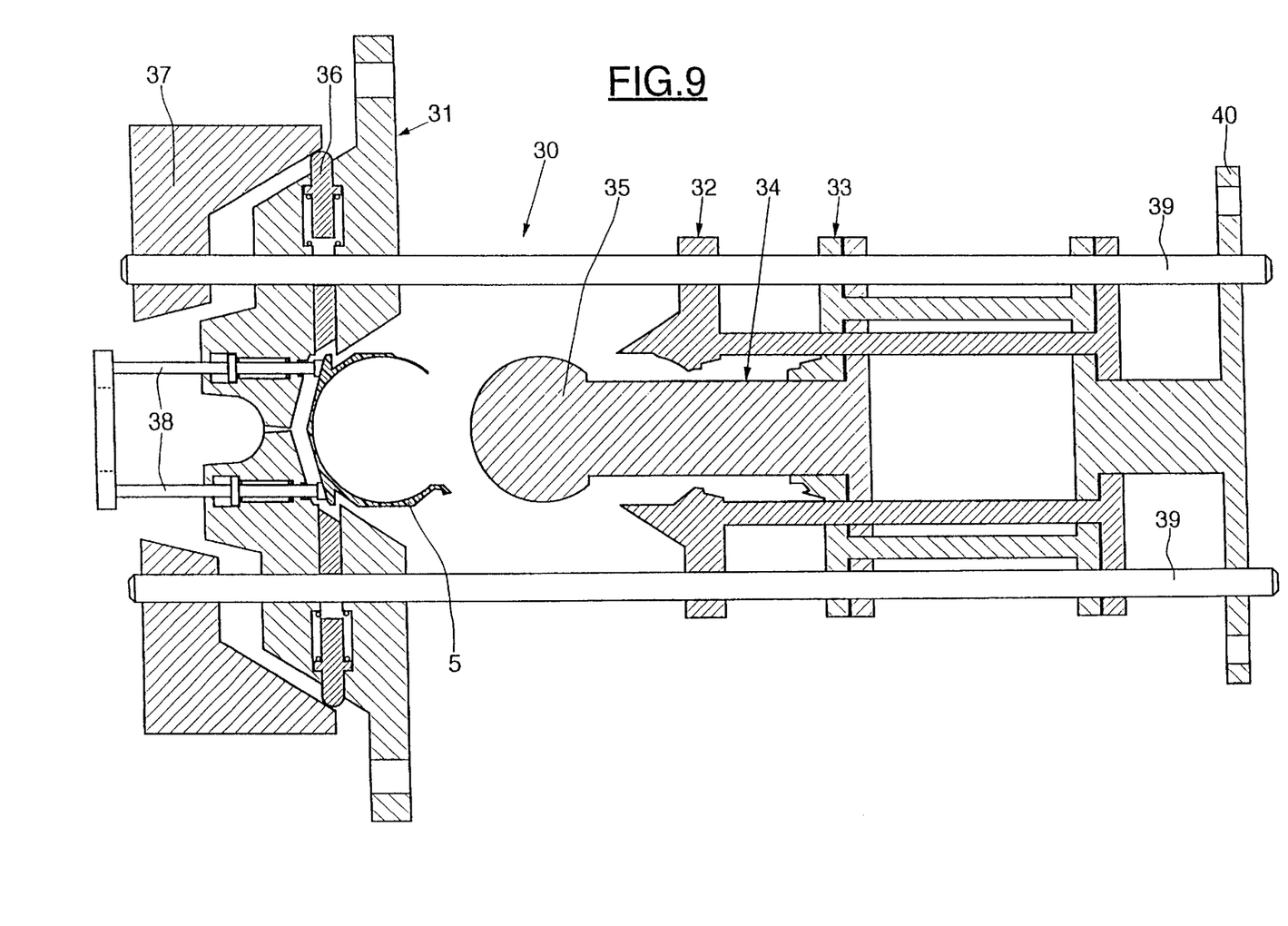

Movable mold platens 32, 33, movable core 34 and movable blocking platen 37 are mounted to slide on uprights 39, movable platens 32, 33 and movable core 34 being connected in such a way that an action on one of these elements, in the present case on mold platen 33, at 40, in the direction of opening of injection-molding machine 30, toward the right in FIG. 4, causes a sequence of phases of removal from the mold according to FIGS. 5, 6, 7, before two sequences of unblocking and ejection according to FIGS. 8 and 9.

According to FIG. 5, only movable mold platen 33 is displaced toward the right, following a first stroke applied at 40.

According to FIG. 6, the two mold platens 33 and 32 are displaced simultaneously toward the right, following a second stroke applied at 40.

According to FIG. 7, the two movable mold platens 32, 33 and movable core 34 are displaced simultaneously to the right, following a third stroke applied at 40. Since bearing shell 5 is retained in fixed mold platen 31 by slides 36 maintained in blocking position by blocking platen 37, the displacement of head 35 of core 34 causes expansion of the orifice part of bearing shell 5 and consequently rupture at the position of rupture zones 16, thus giving the parts situated between rupture zones 16 sufficient elasticity to permit elastic expansion to allow removal of head 35.

According to FIG. 8, the displacement of movable blocking platen 37 toward the left permits slides 36 to be disengaged radially toward the outside, to release bearing shell 5.

Finally, according to FIG. 9, ejectors 38 eject bearing shell 5 released by slides 36 from fixed mold platen 31.

The process of removal from the mold with rupture as represented and described makes it possible to obtain a bearing shell which, as soon as it has been removed from the mold, is ready to receive the spherical head of a ball-joint pivot for the purpose of making a ball-joint module comprising the ball-joint pivot, the bearing shell and the locking ring in assembled form, this module being capable of being mounted as such in the ball-joint case.

By virtue of the control of friction and damping that the ball joint according to the invention permits by the design and geometry of the bearing shell and by the process for manufacturing same, as a consequence of the perfect adjustment of the inside contour of the bearing shell to the spherical head of the pivot and of the outside contours to the housing of the ball-joint case and to the locking ring, the ball joint according to the invention can be made not only without radial or axial play, but also with predefined damping, and therefore with wear reduced to the minimum throughout the entire life of the ball joint.

What is claimed is:

1. A ball joint, especially a motor-vehicle steering or suspension ball joint, comprising a pivot provided with a spherical head, a ball-joint case provided with a housing to receive the pivot head, and a bearing shell of plastic material interposed between the pivot head and the case housing, wherein the bearing shell of the ball joint comprises a one-piece molded cup, closed at a bottom side and provided, by molding, with a spherical inside surface extending over a solid angle corresponding to more than one hemisphere, with a circular orifice, whose diameter is smaller than a diameter of the spherical inside surface and which is disposed opposite the bottom side, and with a plurality of rupture zones of small thickness distributed over a circumference of the orifice, while extending from the orifice toward an equatorial plane of the spherical inside surface disposed parallel to a plane of the said orifice, the rupture zones having a conformation that each undergoes predefined rupture into two sections during a first expansion of the orifice and that, after insertion of the head of the pivot into the bearing shell, elastic constriction of the orifice is permitted together with exact repositioning of the two sections of each rupture zone around the pivot head.

2. A ball joint according to claim 1, wherein the rupture zones have a conformation such that each gives rise to a rupture along a predefined line of weakness.

3. A ball joint according to claim 2, wherein the line of weakness has a zig-zag shape.

4. A ball joint according to claim 1, wherein the bearing shell is provided on the outside, in an equatorial zone, with a cylindrical part, which toward the bottom side is followed by a substantially conical part, and in that the housing of the case is provided with a cylindrical part followed by a substantially conical bottom part.

5. A ball joint according to claim 4, wherein the conical part of the bottom of the housing of the case comprises a frustoconical outside zone, with a taper angle larger than a taper angle of the conical outside part of the bottom zone of the bearing shell and a conical central inside zone with a taper angle smaller than a taper angle of the conical outside part of the bearing shell.

6. A ball joint according to claim 5, wherein the bearing shell is provided, between its cylindrical outside part and its orifice, with a frustoconical outside part followed at a level of the orifice by an outside shoulder, and in that the ball joint additionally comprises a locking ring provided with a frustoconical inside surface corresponding to the frustoconical outside part of the bearing shell, and which, after insertion of the head of the pivot into the bearing shell, can be interlocked behind the shoulder of the bearing shell to maintain the assembled pivot and bearing shell in a form of a module configured to be mounted in the ball-joint case and of being fixed therein.

7. A process for manufacture of a ball-joint bearing shell according to claim 1, wherein the bearing shell is molded between a fixed mold part whose cavity corresponds at least to the bottom part of the bearing shell, at least one movable mold part whose cavity corresponds at least to the orifice part of the bearing shell, and a movable core with a spherical head, whose shape corresponds substantially to a shape of the spherical head of the pivot of the ball joint, wherein, to remove the bearing shell from the mold, there are successively displaced a) the movable mold part, to release the orifice part of the bearing shell, or in other words the part comprising the rupture zones, toward the outside, and b) the movable core, to extract the spherical head of the bearing shell on the orifice side, while causing well-defined rupture of the said rupture zones by expansion of the orifice part of the bearing shell.

8. A process according to claim 7, wherein the bearing shell is blocked in the fixed part of the mold during extraction of the spherical head of the core.

* * * * *